United States Patent [19]
Okamori et al.

[11] Patent Number: 5,765,934
[45] Date of Patent: Jun. 16, 1998

[54] PROJECTION TYPE DISPLAY

[75] Inventors: Shinji Okamori; Akira Daijogo; Hiroshi Kida; Shinsuke Shikama; Eiichi Toide, all of Tokyo, Japan

[73] Assignee: Mitsubishi Denki Kabushiki Kaisha, Tokyo, Japan

[21] Appl. No.: 690,670

[22] Filed: Jul. 31, 1996

[30] Foreign Application Priority Data

Aug. 4, 1995 [JP] Japan .................................. 7-199554
Oct. 11, 1995 [JP] Japan .................................. 7-263124

[51] Int. Cl.$^6$ .................................................. G03B 21/28
[52] U.S. Cl. .......................... 353/94; 353/38; 353/99; 362/234; 362/299
[58] Field of Search ............................. 353/38, 37, 102, 353/121, 122, 94, 98, 99; 359/42, 894, 639, 640, 638; 362/32, 308, 234, 244, 245, 297, 299; 349/61, 62, 63, 67, 5; 385/901

[56] References Cited

U.S. PATENT DOCUMENTS

| | | | |
|---|---|---|---|
| 5,046,837 | 9/1991 | Stroomer | 353/99 |
| 5,108,172 | 4/1992 | Flasck | 353/37 |
| 5,299,036 | 3/1994 | Nicolas et al. | |
| 5,300,966 | 4/1994 | Uehira et al. | 353/30 |
| 5,414,600 | 5/1995 | Strobl et al. | 362/32 |
| 5,649,753 | 7/1997 | Masumoto | 353/38 |

FOREIGN PATENT DOCUMENTS

| | | | |
|---|---|---|---|
| 63-123019 | 5/1988 | Japan . | |
| 2190821 | 7/1990 | Japan | 359/42 |
| 0422938 | 1/1992 | Japan | 349/62 |
| 4-11492 | 1/1992 | Japan . | |
| 4-204883 | 7/1992 | Japan . | |
| 6-138386 | 5/1994 | Japan . | |

*Primary Examiner*—William Dowling

[57] ABSTRACT

In a light source apparatus for use with a projection type display, at least one light source is provided for emitting light. A reflector is provided correspondingly to the light source in order to gather the light emitted from the light source into a small area to form a converged luminous flux. A light guide has at least one light input section into which the luminous flux is coupled. The light input section is provided correspondingly to the light source. The light guide combines the luminous flux received through the light input sections into a single beam of luminous flux. The light-guide has at least one light output section from which said luminous flux is output. The light source apparatus may also include light-refracting element provided between the reflector and the light-guide. The light-refracting element receives the converged luminous flux from the reflector to refract the converged luminous flux so as to couple the converged luminous flux, as a uniform luminous flux, into the light-guide.

25 Claims, 11 Drawing Sheets

F (FOCAL POINT)

PROJECTION TYPE DISPLAY

BACKGROUND OF THE INVENTION

This invention relates to a light source apparatus for use with a projection type display in which light valves are used to project a video image, and to a projection type display using the light source.

A projection type display such as a video projector is one example of an apparatus used for projecting a color image onto a large screen. A liquid crystal projector is inherently small in size and lends itself to a small size, lighter weight projection type display. Thus, the liquid crystal projector is obviously more advantageous than a large size, heavy CRT type projector, and is now receiving more attention. The liquid crystal projection type display offers a compact multi-projection type display in which a plurality of screens are combined into a large single screen. Multi-projection type displays are disclosed in, for example, Japanese Patent Preliminary Publications No. 63-123019 and No. 6-138386. Both publications disclose a large, high resolution screen formed by combining a plurality of projection units.

The optical performance of a projection type display using a light valve greatly depends on the illumination optical system that illuminates the light valve, particularly the characteristics of the light source. Liquid crystal projectors use a light source such as a tungsten halogen lamp, metal halide lamp, and xenon lamp. These light sources are not an ideal spot light source, while the light emitted from a non-ideal light source is condensed by a reflecting mirror such as a parabolic mirror, elliptic mirror, and spherical mirror that have a substantially ideal shape. As a result, the image projected on the screen is not uniform. Manufacturing variations of the lamps are also a source of significant differences in efficiency, color temperature, and useful life of the lamp. Such differences cause non-uniformity in brightness and color of the projected image, deteriorating the quality of the projected image.

In order to solve the aforementioned problems, Japanese Patent Preliminary Publication No. 4-204883 discloses a liquid crystal projector using optical fibers. FIG. 11 shows a general construction of the prior art light source apparatus for the liquid crystal projector.

An illumination system is constructed of a metal halide lamp 11 and reflector 12, and the light emitted from the system is condensed by a lens 14a. The light is then incident upon a bundle 16 of optical fibers to which connectors 165 and 166 are connected. The bundle 16 of optical fibers includes a plurality of element optical fibers, and the arrangement of the element optical fibers at the end at which the light is incident are not correlated at all with the arrangement of the element optical fibers at the end at which the light is emitted. This ensures that light having uniform distribution of intensity throughout the overall light pattern is emitted from the light-emitting end of the bundle 16 even if the intensity of light at the light-incident end of the bundle 16 is non-uniform. The light is diverged by a lens 14b before illuminating a liquid crystal panel 6 which has a condenser lens 14c and two polarizing plates 60 and 61. The output of the polarizing plate 61 then passes through a projection lens 8 to project an image onto the screen. The projected image with a uniform intensity is thus obtained.

A light-emitting element 110 of the lamp is usually oriented so that the light-emitting element lies longitudinally in line with the optical axis as shown in FIG. 11 when using a parabolic mirror or an elliptic mirror. No light is reflected at the hole in the mirror through which the light-emitting element is inserted. Also light reflected at the mirror is prevented from passing through the light-emitting element positioned at the focal point. The light emitted from the combination of the lamp 11 and the reflector 12 is less intense in the central area than the other areas.

FIG. 6 shows the operation of an optical guide formed of an optical fiber. When light travels in an optical fiber, the light propagates by total reflection due to the difference in refractive index between the cladding and the core. For instance, parallel light 81 incident upon the light guide 16 at an angle with the optical axis travels through the light guide 16, while being repetitively reflected, and exits the light guide 16 at the same angle with the optical axis.

As a result, the projected light 83 is less intense in the central area than in the other areas. This phenomena is true for optical fibers of any diameters as long as a beam of parallel light is coupled into a light guide using total reflection of light. The non-uniform distribution of illumination is an inherent drawback in the light guide using the total reflection of light.

Therefore, in general, if light incident on the fiber contains less amount of light incident at angles nearly parallel to the optical axis than at larger angles with the optical axis, the projected light is of an annular light pattern where the light is less intense in the central area than in the other areas. Although the light guide disclosed in Japanese Patent Preliminary Publication No. 4-204883 eliminates non-uniformity in illumination and color, the tendency of the central area being less intense than the other areas of the projected image cannot be eliminated as long as incidence angle distribution of the incident light is non-uniform.

With a liquid crystal projector in which a plurality of unit images are combined into a large, single screen, unit images differ not only in intensity but also in the tone of colors. Such variations in the intensity of the image and the tone of colors are due to variations in characteristics of the light sources in the respective units and seriously deteriorate the quality of a displayed image. The prior art disclosed in Japanese Patent Preliminary Publication No. 6-138386 mentioned above does not address the problem that differences in characteristics among a plurality of light sources cause variations in image quality, and also suffers from a drawback that a part of the resultant combined image is completely lost if any one of the light sources fails to glow due to, for example, the end of useful life.

FIG. 10 illustrates a general construction of an optical system of another prior art liquid crystal projector.

A white-light lamp 11 takes the form of, for example, a metal halide lamp, xenon lamp, or tungsten halogen lamp, and emits a beam of light. The beam of light is reflected by an elliptic mirror 12 and is condensed. The condensed light is then reflected by a mirror 13 and is incident upon the collimator lens 14 which converts the incident light into a parallel luminous flux 15. The parallel luminous flux 15 passes through a dichroic mirror 2GR and then through a dichroic mirror 2G. The dichroic mirror 2GR reflects green and red lights but passes blue light which is then reflected by a mirror 3. The dichroic mirror 2G reflects green light but passes red light. Thus, the parallel luminous flux 15 is separated into red, green, and blue lights. The red, green, and blue lights pass condenser lens 21R, 21G, and 21B, respectively, and then are incident upon liquid crystal panels 6R, 6G, and 6B, respectively. The liquid crystal panels 6R, 6G, and 6B are driven by respective drive circuits, not shown, to display monochromatic images, respectively, corresponding to the red, green, and blue components of the image to be displayed.

The light modulated by the images formed on the respective liquid crystal panels are then combined into a composite luminous flux by dichroic mirrors 70G and 70GB. The luminous flux then passes through a projection lens assembly 8 which converts the luminous flux into a projection light 9 so as to project a magnified color image onto a screen 10 for viewing. The condenser lenses 21R, 21G, and 21B convert the parallel luminous flux into a condensed luminous flux so as to efficiently direct the luminous flux into the projection lens assembly 8. Precise focusing is effected by moving a part of the lens system that forms the projection lens assembly 8 or the entire projection lens assembly 8 back and forth in the direction of optical axis.

The prior art apparatus shown in FIG. 11 is disadvantageous in that the apparatus cannot be used if the single lamp 11 fails to glow due to, for example, the end of its life. Moreover, since only one lamp is used, an amount of light available from the single lamp is limited, and the brightness of the projected image cannot be increased.

Japanese Patent Preliminary Publication No. 4-11492 discloses a liquid crystal projector that simultaneously uses two lamps in order to solve the aforementioned problem of a single lamp. The prior art disclosed in the publication uses two lamps so that the projector can still operate after one of the lamps fails to glow. The light emitted from the two lamps are combined by the use of half-silvered mirrors, and therefore the half of the energy of each of two beams of luminous flux is inherently lost. This is disadvantageous if the brightness of the projected image is to be increased by increasing the intensity of luminous flux emitted from the liquid crystal panels. Further, more electric power is required to obtain a desired amount of light.

SUMMARY OF THE INVENTION

An object of the invention is to provide a light source apparatus which eliminates variations in brightness and color resulting from an illumination system constructed primarily of lamps and reflectors, and which outputs an illumination luminous flux having uniform angle distribution.

Another object of the invention is to provide a light source apparatus in which differences in optical characteristics such as brightness and color between a plurality of light sources are averaged out and a plurality of beams of illumination luminous flux having uniform angle distribution is provided.

Still another object of the invention is to provide a light source apparatus which can be installed at a location away from the main body of a projection type display so as to facilitate replacement of lamps and control over temperature.

Yet another object of the invention is to provide a high quality projection type display in which non-uniformities in the brightness and tone of color of the image displayed on the projection screen are substantially reduced.

Further object of the invention is to provide a high quality multi-projection type display in which differences in optical characteristics such as brightness and color between a plurality of light sources are averaged out and non-uniformities in the brightness and color on the projection screen are substantially reduced.

Still further object of the invention is to provide a light source apparatus in which should a light source fail to glow due to for example, trouble of some lamps, the display is maintained by the remaining lamps so as to prevent the image on the screen from losing part of it.

Yet further object of the invention is to provide a projection type display which offers high brightness of the display at low power consumption.

A light source apparatus according to the present invention is for use with a projection type display. At least one light source is provided for emitting light. A reflector is provided correspondingly to the light source in order to gather the light emitted from the light source into a small area to form a converged luminous flux. A light guide has at least one light input section into which the luminous flux is coupled. The light input section is provided correspondingly to the light source. The light guide combines the luminous flux received through the light input sections into a single beam of luminous flux. The light-guiding means has at least one light output section from which the luminous flux is output.

The light source apparatus also includes light-refracting element provided between the reflector and the light-guide. The light-refracting element receives the converged luminous flux from the reflector to refract the converged luminous flux so as to couple the converged luminous flux into the light-guide.

The light source apparatus may further include first lenses located between the light input section and the refracting means, and second lens located downstream the light-guiding means. The first lenses couples the luminous flux refracted by the light-refracting element into the light-guide. The second lens has a focal point located between the second lens and the light output section, and is positioned such that the luminous flux exits the light output section at a position upstream or downstream of the focal point.

The light-guide may be in the form of an optical fiber where a hollow cylindrical cladding is filled with any one of a transparent gel-like medium, transparent liquid medium, transparent glass medium, and transparent macromolecular medium. The cylindrical cladding having a refractive index smaller than that of the medium filled in the cladding. Another form of the light-guide is a bundle of element optical fibers randomly arranged both in a first plane through which the light is incident on the fibers and in a second plane through which the light exits the fibers so that there is no correlation between arrangement in the first and second planes. Still another form of the light-guide is a molded plastics or a molded rubber.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First Embodiment

Figure 1:
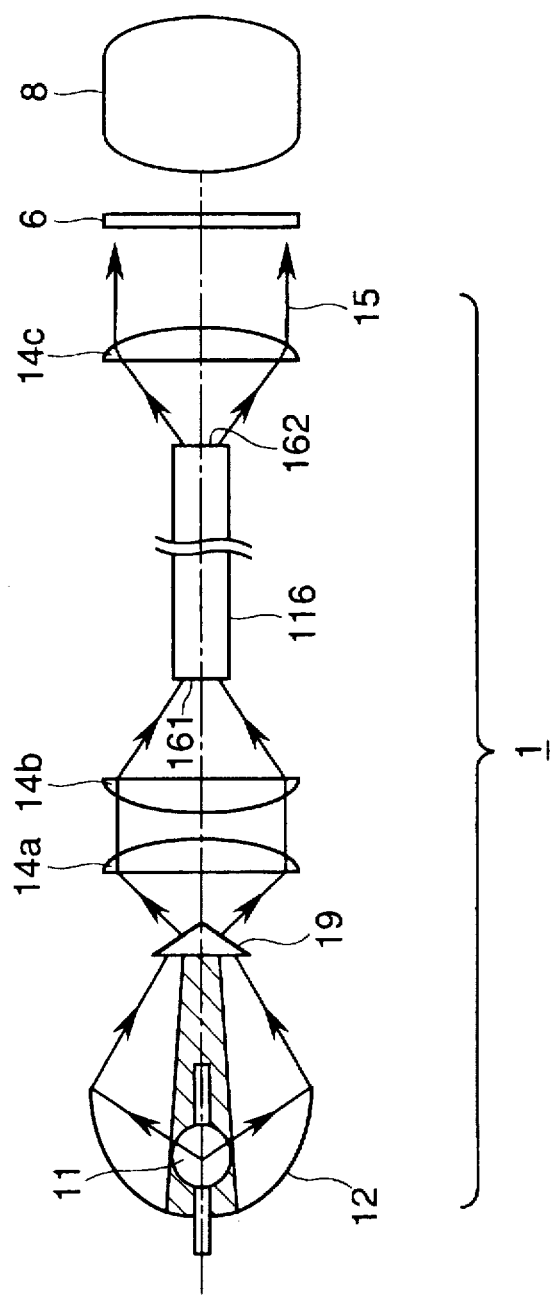
FIG. 1 illustrates a general construction of a light source according to a first embodiment of the invention.

FIG. 1 illustrates a general construction of a light source 1 according to a first embodiment of the invention. Referring to FIG. 1, the light source 1 includes a concave reflecting mirror 12, lamp 11, light-refracting element 19, light guide 116, and lenses 14a–14c. The rest of the construction is the same as the prior art construction shown in FIG. 11. The lamp 11 is a white lamp in the form of, for example, a metal halide lamp, xenon lamp, or tungsten halogen lamp. The concave reflecting mirror 12 takes the form of, for example, a well-known elliptic mirror having an ellipsoidal surface of revolution centered on the optical axis or a later described orthogonal parabolic reflector having a paraboloid of revolution centered on the optical axis. The light-refracting element 19 takes the form of, for example, a cone, and is located in the vicinity of the converging point of the reflecting mirror 12. The lens 14b converges the luminous flux into the light guide 116 in the form of a bundle of optical fibers, and the lenses 14a and 14c convert the luminous flux into a substantially parallel luminous flux. The light guide 116 receives the luminous flux from the lens 14b at a location where the diameter of the luminous flux from the lens 14b becomes smallest.

The operation of the first embodiment will now be described. The luminous flux emitted from the lamp 11 is reflected by the reflecting mirror 12 into a convergent bundle of rays which is incident on the light-refracting element 19 disposed in the vicinity of the converging point. The divergent bundle of rays exiting the light-refracting element 19 is converted into a parallel luminous flux by the lens 14a. The parallel luminous flux exiting the lens 14a is again converted by the lens 14b into a convergent bundle of rays before entering the light guide 116. The divergent bundle of rays outputted from the light guide 116 is again converted by the lens 14c into a parallel luminous flux which efficiently illuminates a light valve 6.

The light-refracting element 19 is preferably a cone of transparent glass or polymer, and is arranged in the light path with the flat surface facing the lamp 11 and with the axis of the cone in line with the optical axis as shown in FIG. 1. The optical system of the first embodiment is an illumination optical system where the reflecting mirror 12 is used to condense the luminous flux emitted from the lamp 11. The reflecting mirror 12 has a round hole formed therein at its rear end for receiving the lamp 11, where no light is reflected. The lamp 11 itself blocks the luminous flux, causing the luminous flux to be less intense in the vicinity of the optical axis (hatched portion in FIG. 1) than in areas away from the optical axis. This range of angle over which the luminous flux is less intense extends about 10 degrees of the optical axis. Thus, the round hole and the lamp itself cause non-uniformity in the illumination of the light valve 6. The refraction of light occurring at the interface between the light-refracting element 19 and the air can be used to vary the angle of divergence of luminous flux if the values of vertex angle and refractive index of the material of the cone are appropriately selected. The light source of the present invention effectively eliminates the problem that the light is less intense in the central area. The luminous flux exiting the light-refracting element 19 is highly uniform.

The light guide 116 is preferably a bundle of optical fibers formed of a plurality of known small-diameter optical fibers. Although the luminous flux incident on the light guide 116 has been converted by the light-refracting element 19 into an illumination pattern flux having uniform incidence angle distribution, the intensity of the light pattern is made even more uniform by the random rearrangement of the element fibers in which the arrangement of the element optical fibers at the light incident end is not correlated with the arrangement of the optical fibers at the light exiting end. Light coupled into an optical fiber travels simply therethrough to the exit end and is not coupled into any other optical fibers. The element fibers need not be arranged highly randomly if the image projected on the screen is within a tolerable range of non-uniformity in illumination and color. Less randomly arranging the element fibers exerts less mechanical stress on the element fibers, suppressing internal loss such as total reflection loss for highly efficient light transmission as well as allowing the use of element fibers of a variety of diameters.

As far as uniform intensity of light pattern can be obtained, the light guide 116 may be formed by combining a plurality of kinds of light-transmitting medium. The light guide 116 may be of hybrid construction formed of a combination of a bundle of randomly rearranged optical fibers, and a hollow cylindrical cladding filled with any one of a transparent gel-like medium, transparent liquid medium, transparent glass medium, and transparent polymer medium, having a refractive index higher than the cladding, or a single molded plastics or a molded rubber, or a hollow light guide having a reflecting surface, which is connected together to the bundle of randomly rearranged optical fibers for improved overall transmittance. Kinds of light-transmitting medium may be selected according to desired optical properties in addition to uniform intensity of light pattern. Molded rubber may be used if a flexible light guide is desired.

The maximum allowable incident angle of the light guide 116 is determined by the refractive index of the medium. If the convergence angle of luminous flux exiting the lens 14b is larger than the maximum incident angle, a negative lens, not shown, may be added downstream of the lens 14b, so that the luminous flux is efficiently coupled into the light guide 116. An antireflection coating may be applied to the light-receiving end and light-exiting end of the light guide 116 so that light can efficiently enter and exit the light guide 116.

The maximum divergent angle of the luminous flux exiting the light guide 116 is also determined for the same reason as for the maximum allowable incident angle. The rough requirement of the lens 14c is determined by the numerical aperture or NA enough for receiving the luminous flux exiting the light guide 116, and the focal length given by the diameter of the parallel luminous flux. It is known that the light valve 6 can be most efficiently illuminated by using the light guide 116 in the form of a bundle of optical fibers and by positioning the light-exiting end of the light guide 116 at the front focal point of the lens 14c. However, an experiment revealed that such arrangement causes the pattern of the element fibers in the plane of light-exiting end of the light guide 116 to appear on the screen, not shown, when the screen is illuminated, seriously deteriorating the image quality.

Another experiment revealed that the projection of pattern of the element fibers may be eliminated by using the lens 14c having a diameter such that the diameter of the illumination luminous flux is smaller than the diagonal distance of the light valve 6, and by positioning the light guide 116 in such a way that the light-exiting end of element fibers is offset from the front focal point of the lens 14c, (i.e., is closer to or farther away from the lens 14c than the front focal point). In the experiment, an illumination optical system is constructed by arranging a metal halide lamp in combination with an elliptic mirror, cone, bundle of element optical fibers, and condenser lens 14c in the order. The metal halide lamp has an arc length of 3 mm. The cone has a bottom with a diameter of 20 mm. The bundle of element optical fibers has a length of 500 mm and a bundle diameter of 6 mm, each element fiber having a diameter of 50 microns. The condenser lens 14c has a focal length of 38.5 mm, diameter of 50 mm, and front focal length 24.3 mm. A rectangular dummy light valve, 19.8 mm high and 26.4 mm wide, was positioned 135 mm away from the vertex of the condenser lens 14c, and was illuminated by the luminous flux. The image through the light valve was projected onto the projection screen using a projection lens with a magnification of about x23, and investigation was made on the relationships between the image of the pattern of element fibers observed on the screen and the distance from the light-exiting end of the light guide to the condenser lens 14c.

When the light-exiting end was about 29 mm away from the condenser lens 14c, the image of the pattern of the light-exiting ends of the element fibers of about 470 mm in diameter formed on the screen was observed and the arrangement of the optical fibers was observed. Then, displacing the light-exiting end 10 to 20 mm closer to or away from the condenser lens 14c made the image of pattern of the element fibers difficult to observe while the illumination light from the condenser lens 14c still sufficiently illuminates the entire rectangular screen of the light valve. The aforementioned experiment showed that efficient illumination is achieved if the diameter of illumination luminous flux on the projection screen is greater than about 70% of a diagonal length of the rectangular screen of the light valve when the image of pattern of the element fibers is clearly formed on the projection screen.

It is known that when an elliptic mirror having ellipsoidal surface of revolution as a reflecting mirror is used and the light-emitting point of the lamp is disposed in proximity to the first focal point of the mirror, the light emitted from the lamp may be converged in the vicinity of the second focal point with high efficiency. It has been found desirable to dispose the light-emitting point slightly away from the first focal point for higher efficiency of convergence of light. The reflecting mirror 12 may be in the form of the aforementioned elliptic mirror which has an aperture diameter of 66 mm and a distance between the first and second focal points of 60 mm, and a metal halide lamp 11 which has a discharge arc length of 3 mm. Best result was obtained when the lamp (high voltage discharge lamp) 11 was positioned so that the center of arc was 2–3 mm closer to the second focal point from the first focal point.

The reflecting mirror 12 may alternatively be in the form of an OPR (Orthogonal Parabolic Reflector). The reflecting surface of a conventional parabolic mirror is a curvature described by the rotation of a curve given by Equation (1) about the x-axis of the ordinary coordinate (x, y):

$$y^2 = 4fx \quad (1)$$

where f is a focal length. The OPR shown in FIG. 4 has a curvature described by the rotation of a curve derived from Equations (2) and (3) about the Y-axis.

$$Y = 2\{f(f+X)\}^{1/2} \text{ where } -f \leq X \leq 0 \quad (2)$$

$$Y = 2\{f(f-X)\}^{1/2} \text{ where } 0 \leq X \leq f \quad (3)$$

Figure 4:
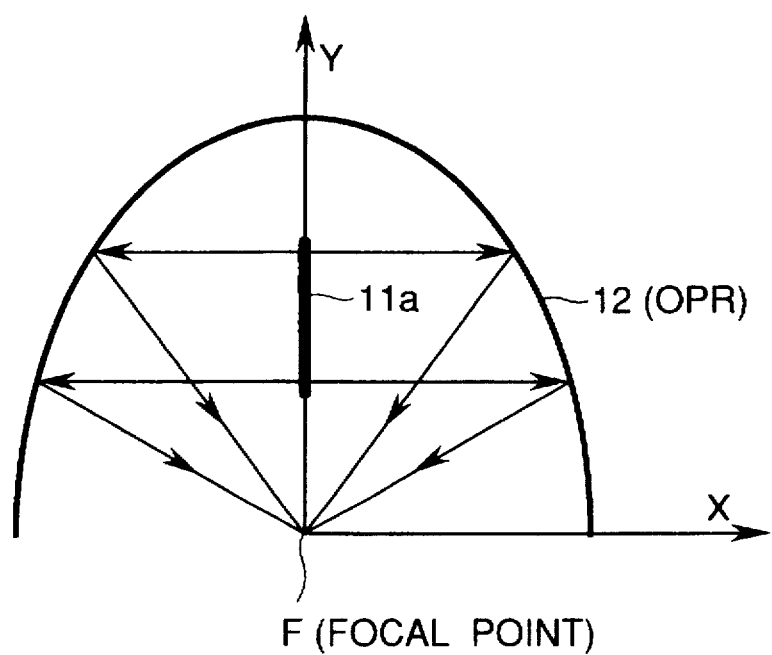
FIG. 4 shows an orthogonal parabolic reflector having a curvature.

The coordinate (X, Y) is an orthogonal coordinate obtained by shifting the orthogonal coordinate (x, y) of Equation (1) in the x-axis so that the origin of the coordinate (X, Y) is (f, 0) of the coordinate (x, y). FIG. 4 illustrates the principle of the OPR. The OPR functions to efficiently converge the light, which is emitted in a direction perpendicular to the direction in which the strip-shaped light source extends, to a focal point F. In the present invention, the strip-shaped arc of the discharge lamp is preferably positioned on the Y-axis (rotation axis) of the OPR.

The first embodiment has been described with respect to the light-refracting element 19 having a diameter of luminous flux exiting therefrom greater than the effective diameter of the light guide 116. The lenses 14a and 14b may be omitted so that light exiting the light-refracting element 19 is directly incident on the light guide 116, if the effective diameter of the light guide 116 is large enough compared to the diameter of the luminous flux exiting the light-refracting element 19 and the incidence angle of the light incident on the light guide 116 is smaller than the maximum incident angle.

Second Embodiment

Figure 2:
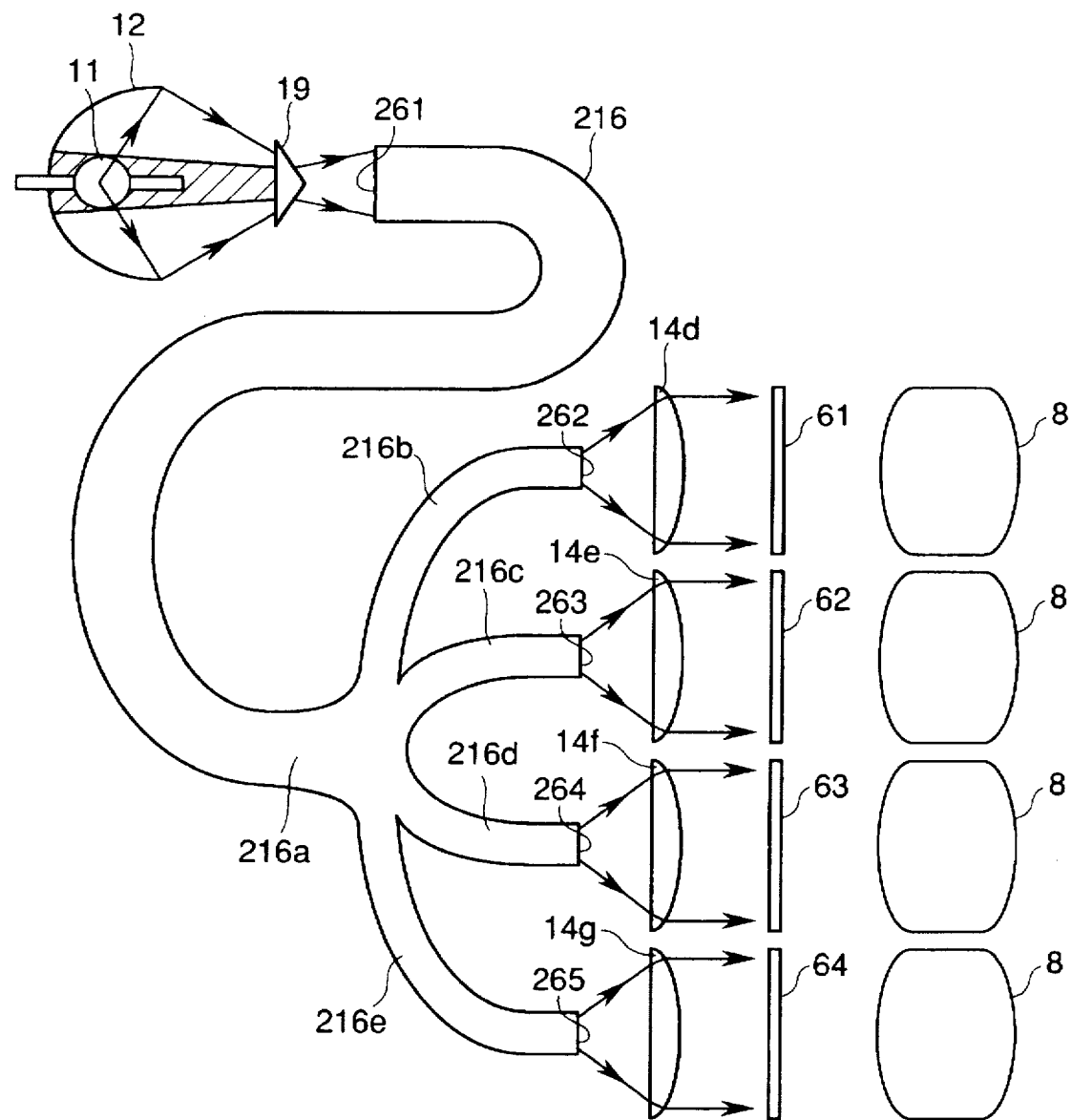
FIG. 2 illustrates a general construction of a light source according to a second embodiment.

FIG. 2 illustrates a general construction of a light source according to a second embodiment. The second embodiment differs from the first embodiment in that the light guide is a single-input-multiple-output light guide having one light input section and n light output sections, n being equal to the number of light valves. FIG. 2 illustrates a light source according to the second embodiment for illuminating four light valves. Structural elements similar to those in the first embodiment have been given similar references and the description thereof has been omitted.

Figure 11:
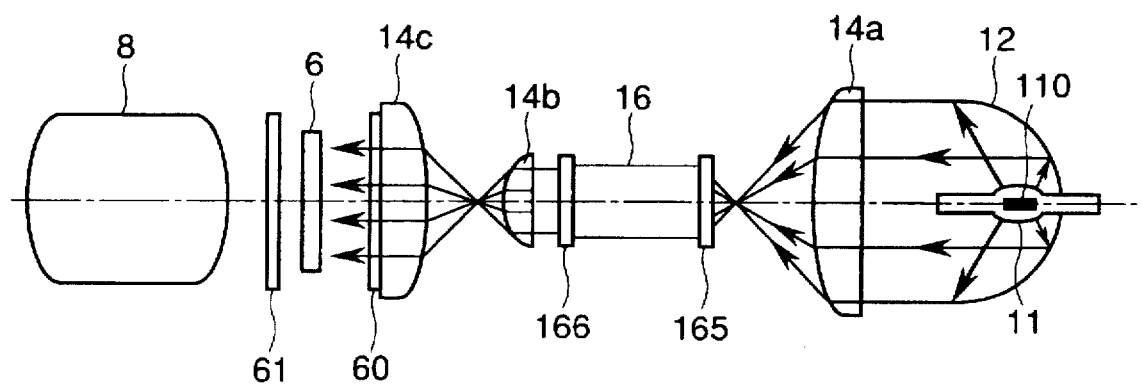
FIG. 11 shows a general construction of a prior art light source apparatus.

The luminous flux emitted from the light-refracting element 19 is incident upon the light-branching guide 216 and is branched into four light output sections 216b–216e by a light-branching section 216a. It is generally desirable that the light is branched into four equal portions if the light valves are of the same design. The light may however be branched in different proportions depending on applications. If the light-branching guide 216 is to be in the form of a bundle of small diameter optical fibers, the element fibers may be randomly arranged at any portion of the bundle, preferably in the plane in which the element fibers are branched or in the plane through which the light exits the element fibers. It is desirable that the element fibers are randomly arranged with different levels of randomness depending on applications. Then, the branched luminous flux which has been randomly arranged are incident upon lenses 14d, 14e, 14f, and 14g, each of which opposing the corresponding one of four light-exiting ends of the light-branching guide 216. The illumination luminous flux exiting the lenses 14d, 14e, 14f, and 14g illuminate light valves 61, 62, 63, and 64, respectively. The stages of the construction that follows lenses 14d, 14e, 14f, and 14g are the same as those of the prior art construction as shown in FIG. 11.

The light-branching guide 216 may be formed of a bundle of optical fibers randomly arranged in the cross section of the light-branching guide 216. In this case, part of the optical fibers having one ends at the input end of the trunk path are divided into four groups, and each group of optical fibers form each of the light output sections. Each group is formed of optical fibers having one ends at randomly arranged at the input end of the trunk path, and the other ends of the optical fibers of each group is also randomly arranged in each of the light output sections.

The light-branching guide 216 may alternatively formed of a cylindrical cladding of an integral construction filled with gel-like transparent medium, liquid transparent medium, transparent glass medium, or transparent polymer medium having a refractive index greater than that of the cylindrical cladding. In this case, the light entering the branching section is reflected in a complicated manner due to complex shape of the branching section and then further enters the respective light output sections.

A plurality of kinds of light guide may also be connected together to form the light-branching guide 216, in which case it is desirable to use an optical adhesive for reduced loss of light at the connections. The diameters and lengths of light output sections 216b–216e after branching may be selected as required. Overall transmittance may be improved by the hybrid construction where light guides formed of a single molded plastics or molded rubber, and light-reflecting hollow light guides are connected. Kinds of light-transmitting medium may be selected according to desired optical properties in addition to uniform intensity of light pattern. Molded rubber may be used if a flexible light guide is desired.

Third Embodiment

Figure 3:
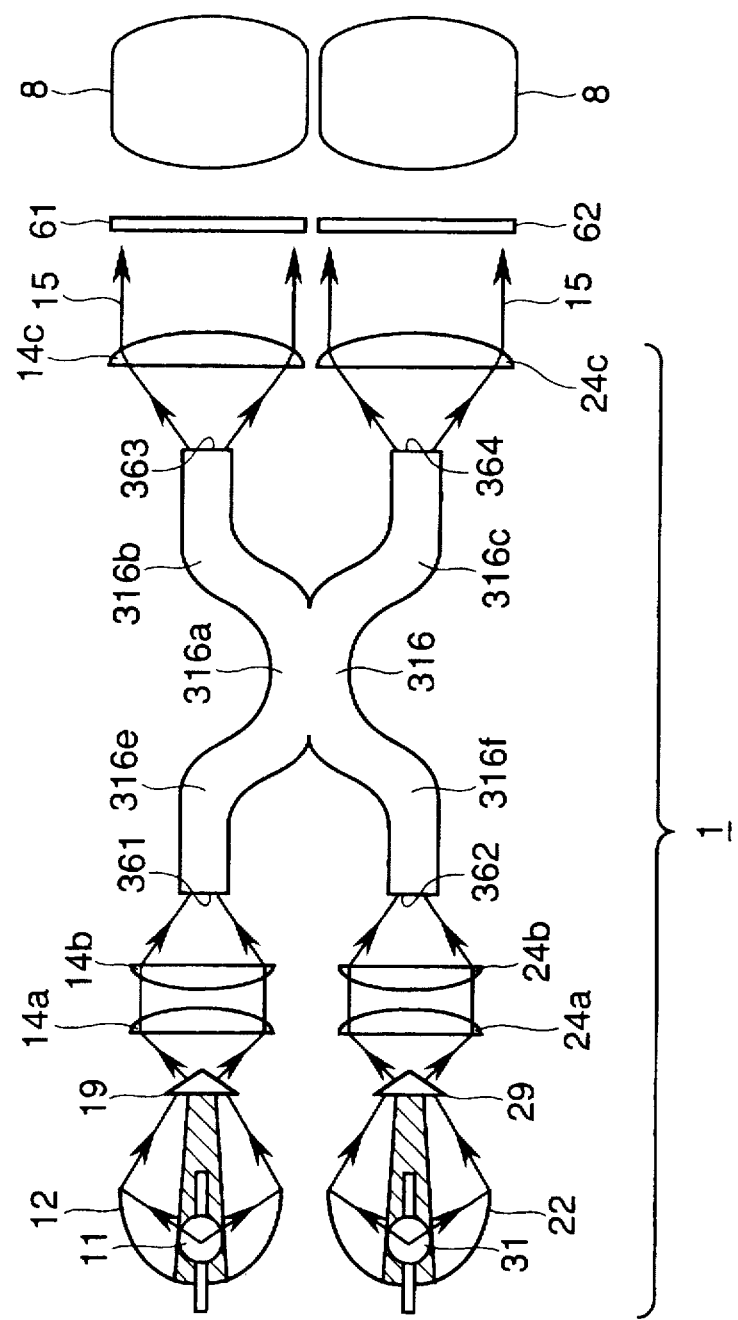
FIG. 3 illustrates a general construction of a light source according to a third embodiment of the invention.

FIG. 3 illustrates a general construction of a light source 1 according to a third embodiment of the invention. Referring to FIG. 3, the light source 1 includes a concave reflecting mirrors 12 and 22, lamps 11 and 31, light-refracting element 19 and 29, light guide 316, and lenses 14a–14c and 24a–24c. The construction subsequent to the lens 14c and 24c is the same as the prior art construction shown in FIG. 11. The lamps 11 and 31 take the form of, for example, a metal halide lamp, xenon lamp, or tungsten halogen lamp. The concave reflecting mirrors 12 and 22 take the form of, for example, a known elliptic mirror having an ellipsoidal surface of revolution centered on the optical axis or an orthogonal parabolic reflector having a paraboloid of revolution centered on the optical axis. The light-refracting elements 19 and 29 take the form of, for example, a cone, and is located in the vicinity of the converging point of the reflecting mirrors 12 and 22. The lenses 14b and 24b converge the luminous flux into the light guide 316 in the form of an optical fiber, and the lenses 14a and 14c and 24a and 24c convert the luminous flux into a substantially parallel luminous flux. The light guide 316 receives the luminous flux from the lenses 14b and 24b at locations where the diameter of the luminous flux from the lenses 14b and 24b becomes smallest.

The operation of the third embodiment will now be described. The luminous flux emitted from the lamps 11 and 31 is reflected by the reflecting mirrors 12 and 22 into a converged luminous flux which is incident on the light-refracting elements 19 and 29 disposed in the vicinity of the converging points of the reflecting mirrors 12 and 22. The divergent luminous flux exiting the light-refracting elements 19 and 29 is converted into a parallel luminous flux by the lenses 14a and 24a. The parallel luminous flux exiting the lenses 14a and 24a is again converted by the lenses 14b and 24b into a convergent luminous flux before entering the light guide 316. The divergent luminous flux outputted from the light guide 316 is again converted by the lenses 14c and 24c into a parallel luminous flux which efficiently illuminates the light valves 61 and 62.

In the third embodiment, the light guide 316 is a multi-branching light guide which includes as many light input sections as there are lamps, a middle portion where the light input sections are combined together, and as many light output sections as there are light valves. The light guide 316 is preferably in the form of a bundle of small diameter optical fibers. The light guide 316 is branched in equal proportion to form individual light input sections 316e–316f. The light input sections 316e–316f are then combined together at a combining section 316a a sufficient distance from the light-receiving ends 361 and 362. The light guide 316 is again branched in equal proportion at a sufficient distance from the combining section 316a to form individual light output sections 316b and 316c. Each light output section is formed of element fibers randomly gathered in equal proportion from the respective light input sections 316e and 316c. Further, as in the first embodiment, the element fibers may be randomly arranged in the plane in which the light exit the light output sections 316b and 316f. The random gathering of the element fibers effectively eliminates variations in color due to the difference in characteristics of the plural light sources.

A plurality kinds of medium may be combined to form the light guide 316. A bundle of optical fibers is preferably used to branch the light guide into light input sections 316e and 316f, combine the light input sections 316e and 316f, and again branch the light guide 316 into light output sections 316b and 316c. However, the use of element fibers having a circular cross section inherently results in gaps therebetween even though they are bundled in close contact with each other, the gaps leading to loss in transmitted light. Therefore, a hybrid construction may be used where only the combining section 316a may be of multi-branching construction using a bundle of optical fibers, and the respective light input sections 316e and 316f and light output sections 316b and 316c may be formed by connecting other type of light guides. Such light guides may be formed of a cylindrical cladding filled with one of gel-like transparent medium, liquid transparent medium, transparent glass medium, and transparent polymer medium having a refractive index greater than that of the cladding, or a single molded plastics or molded rubber, or a reflective hollow light guide. Kinds of light-transmitting medium may be selected according to desired optical properties in addition to uniform intensity of light pattern. Molded rubber may be used if a flexible light guide is desired.

The behavior of the luminous flux exiting the light guide 316 is the same as in the first embodiment and the detailed description thereof has been omitted. The construction of the first to third embodiments allows the light source 1 to be located at a location away from the projection type display.

Figure 5:
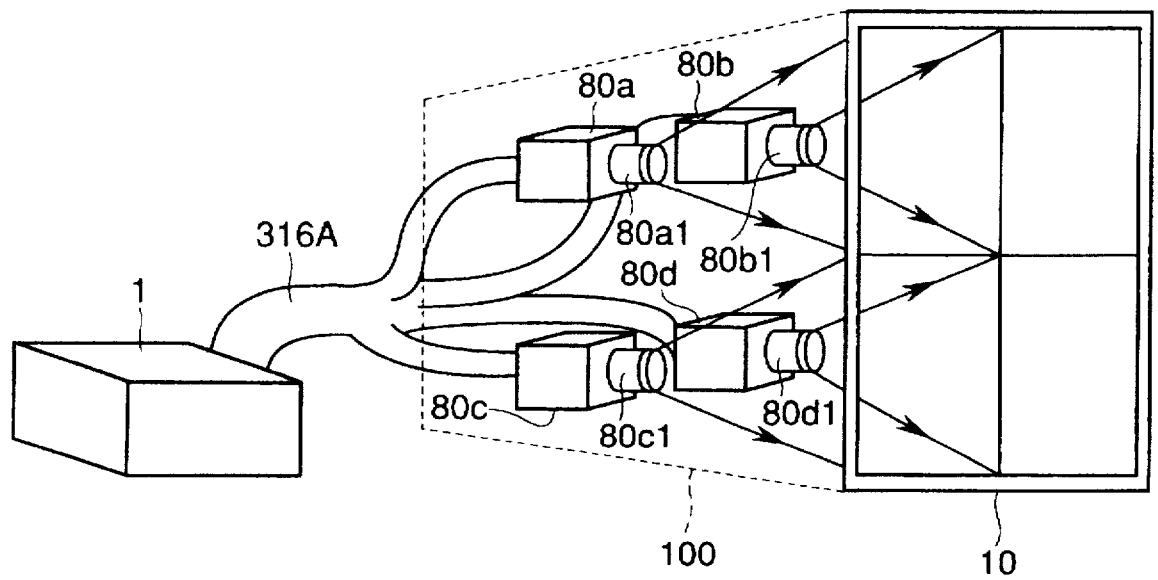
FIG. 5 shows a general construction of a projection type display according to the third embodiment.
Figure 6:
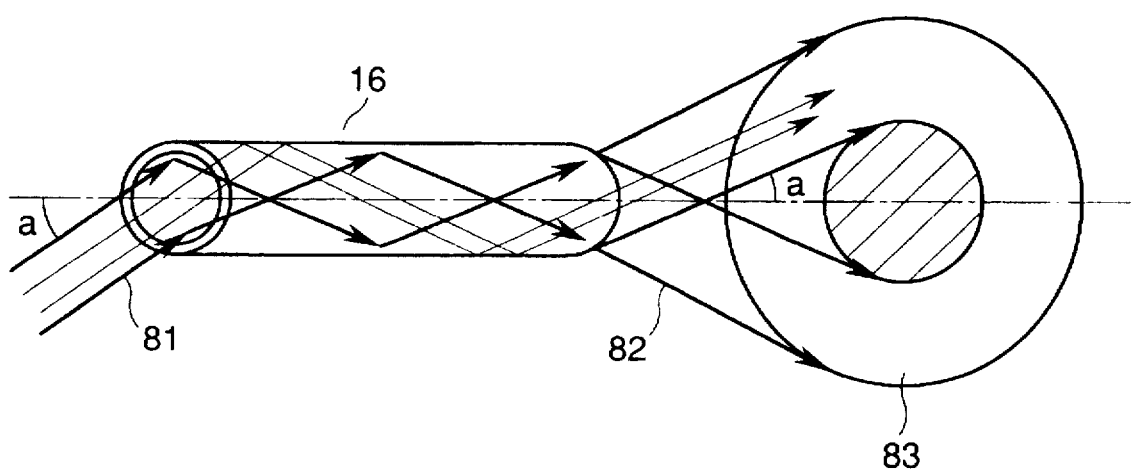
FIG. 6 illustrates the operation of an optical guide.

FIG. 5 shows a general construction of a projection type display 100 to which the light source apparatus according to the third embodiment is applicable. However, four projection units, rather than two as in FIG. 3, are shown to be provided. Referring to FIG. 5, the light emitted from the light source 1 enters the light guide 316A and is directed to individual projection units 80a, 80b, 80c, and 80d and exits from projection lenses 80a1, 80b1, 80c1, and 80d1, respectively. Each projection unit includes an optical system from the light guide 316A to projection lenses, and projects an image onto the screen 10. The projection type display 100 is enclosed by dotted lines.

As shown in FIG. 5, the projection type display 100 is thermally isolated from the light source 1 by means of a light guide 316A, so that control over temperature of the lamps, not shown, is facilitated. The light guide 316A combines the luminous flux emitted from a plurality of lamps into a single luminous flux, and branches the combined light into a plurality of beams. Therefore, when one lamp fails to glow, the projection type display continues to operate with reduced brightness of the projected image.

The third embodiment has been described with respect to a case where there are as many light sources as there are light valves. The embodiments are only exemplary and the multi-branching light guide 116–316 may be formed to have any number of light-receiving ends and light exiting ends depending on the number of light sources and light valves.

Fourth Embodiment

Figure 7:
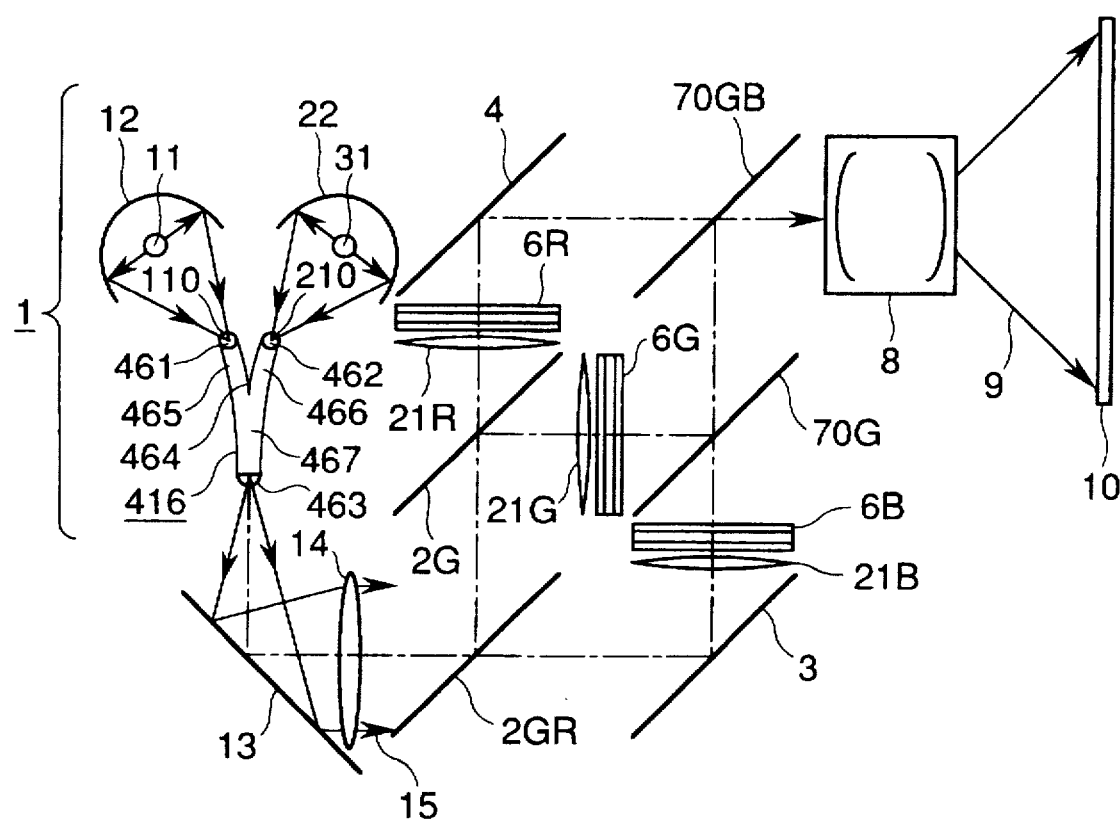
FIG. 7 illustrates a general construction of a light source apparatus according to a fourth embodiment used in a projection type display.

FIG. 7 illustrates a general construction of a light source according to a fourth embodiment used in a projection type display. Referring to FIG. 7, lamps 11 and 31 emit white light and take the form of, for example, a metal halide lamp, xenon lamp, or tungsten halogen lamp. The light emitted from the lamps 11 and 31 are reflected by concave reflecting mirrors 12 and 22, respectively, into a condensed luminous flux. The concave reflecting mirrors 12 and 22 take the form of, for example, an elliptic mirror having an ellipsoidal surface of revolution centered on the optical axis. The condensed luminous flux is then coupled into an optical fiber 416 that has two light-receiving ends 461 and 462 and a light-exiting end 463 and serves as a light guide. A light source 1 is formed of the concave reflecting mirrors 12 and 22, lamps 11 and 31, and optical fiber 416. The construction downstream of the mirror 13 and collimator lens 14, is the same as that of the prior art construction as shown in FIG. 11.

The operation of the fourth embodiment will now be described. The reflecting mirrors 12 and 22 reflect the luminous flux emitted from the two lamps 11 and 31 into convergent bundle of rays at two closely located points 110 and 210, respectively, where the condensed light is incident upon the light-receiving end 461 or 462 of each of two light input sections 465 and 466 of the bifurcated optical fiber 416. The two light input sections 465 and 466 are bundled together at a light combining section 464 into a single light output section 467 to combine the luminous flux received through the light input sections 465 and 466, and the combined luminous flux exits the optical fiber 416 from light-exiting end 463.

The luminous flux exiting the light-exiting end 463 is reflected by the mirror 13 to the collimator lens 14. The collimator lens 14 converts the luminous flux into a parallel illumination luminous flux 15, which in turn is resolved into three primary colors, i.e., red, green, and blue, by dichroic mirrors 2GR and 2G. The dichroic mirror 2GR reflects green and red lights and passes blue light. The dichroic mirror 2G reflects green light and passes red light. The three color lights are projected through the condenser lenses 21R, 21G, and 21B onto the liquid crystal panels 6R, 6G, 6B, respectively.

The liquid crystal panels 6R, 6G, and 6B display monochromatic images corresponding to red, green, and blue, respectively. The respective luminous flux is modulated by the images formed on the liquid crystal panels, and is again combined by dichroic mirrors 70G, 70GB, and a mirror 4. The combined luminous flux is then converted into a projection light 9 by a projection lens 8 which in turn projects a color image on the screen 10 with a certain magnification for viewing. The condenser lenses 21R, 21G, 21B convert the parallel luminous flux into a condensed luminous flux so that the luminous flux is incident upon the projection lens 8 with a good efficiency.

The use of the two lamps as shown in FIG. 7 increases the brightness of the projected image. While only two lamps are used in the fourth embodiment, more lamps may be used for higher brightness of the projected image, in which case the light source includes as many concave reflecting mirrors as there are lamps and a light guide having as many light input sections as there are lamps so as to form a n:1 light-combining guide which combines light emitted from n lamps into a single beam of light.

The fourth embodiment provides a projection type display having two lamps, being advantageous in that the projection type display continues to operate with reduced overall brightness of the projected image if, for example, one lamp fails to glow. The light source apparatus of the aforementioned construction operates on the principle different from the prior art light source apparatus using half-silvered mirrors, and is therefore free from loss in the amount of light when the light emitted from a plurality of lamps is combined. This permits increasing of brightness of the projected image without increased electric power consumption.

The light guide having a single light-exiting end and as many light-receiving ends as there are lamps, offers simple construction of a light source apparatus where the lamps are arranged in a variety of layouts and light beams emitted from a plurality of lamps are combined into a single light beam.

In order to receive and combine the light beams from lamps into a single light beam with least loss, the light guide may be preferably formed of optical fibers bundled together in the shape of Y as shown at 416 in FIG. 7. It is preferable that the optical fiber is of the construction where a hollow cylindrical cladding is filled with any one of a transparent gel-like medium, transparent liquid medium, transparent glass medium, and transparent polymer medium, and the cylindrical cladding has a refractive index smaller than that of the medium used. The light guide may alternatively be a single plastics material or a rubber, molded into a shape of, for example, Y as shown at 416 in FIG. 7. Still alternatively, the light guide may be a bundle of a plurality of small diameter fibers. A bundle of optical fibers is advantageous in that the optical fibers forming two light input sections 465 and 466 may be assembled together in such a way that the optical fibers are randomly arranged in the cross section of the light-exiting end 463 of the light output section 467. This arrangement is effective in averaging the light intensity when the liquid panels 6R, 6G, and 6B are to be uniformly illuminated. Further, the light guide 416 may also be formed by connecting hollow light guides having a reflecting inner surface into a Y-shape as shown at 416 in FIG. 7. This light guide functions as a 2:1 light-combining guide. The hollow light guide may be formed of a highly reflecting metal (e.g., gold, aluminum, silver, or stainless steel) and its inner surface is finished to be mirror-like, or may be formed of a hollow pipe whose inner surface is covered with any of these metals. A protective coating e.g., SiO, SiO2 may be applied to the inner surface of the hollow pipe to prevent oxidation, if required.

Any of the aforementioned materials and constructions of optical fibers/guides may be used alone or in combination to form light input sections and a light output section of an n:1 light-combining bundled fiber or guide.

Optical fibers and/or hollow light guides of the aforementioned construction can be used to combine light emitted from a plurality of lamps. The use of these light guides implements a light source of simple construction which combines light emitted from a plurality of lamps, and offers a variety of arrangement of lamps within the display.

The use of elliptic mirrors as the reflecting mirrors 12 and 22 is advantageous in that the light-emitting element is positioned in the vicinity of the first focal point of the mirror and the emitted light is converged at points 110 and 210 in the vicinity of the second focal point with high efficiency. In order to couple a maximum amount of luminous flux into the optical fiber, it is desirable that the diameter of the focused light spot is selected to be at most the same as the diameter of the light-receiving ends 461 and 462 of the optical fiber 416, and the converging angle θ is selected to be less than a value given by $$\theta = \sin^{-1}(NA) \qquad \text{Eq.(1)}$$

where NA represents the numerical aperture at the light-exiting end of the optical fiber.

In the fourth embodiment, as in the other embodiments, the reflecting mirrors 12 and 22 may alternatively take the form of an orthogonal parabolic reflector (OPR). The strip-shaped arc of the discharge lamp is preferably positioned on the Y-axis (rotation axis) of the OPR. The use of an OPR permits the light emitted from the discharge lamps 11 and 31 having a strip-shaped discharge arc to be condensed into a small light spot, providing highly efficient combination of luminous flux emitted from a plurality of lamps. The OPR effectively gathers light so that adjacent condensed light spots are close to each other, improving the degree of parallelism of the collimated luminous flux and reducing the effective diameter of the projection lens.

For higher brightness of the projected image, a plurality of lamps may be designed to simultaneously glow. It is not likely that more than one lamp fails to glow at the same time, and therefore the apparatus may still operate with a reduced brightness of the projected image even if one of the lamps reaches the end of its useful life.

The light source may alternatively be designed so that, for example, only one lamp may be energized at a time for less power consumption and the second lamp is energized when the first lamp burns out, thereby allowing the display to continue to operate. Alternatively, only a predetermined number of lamps may be energized at the same time for similar result.

Fifth Embodiment

Figure 8:
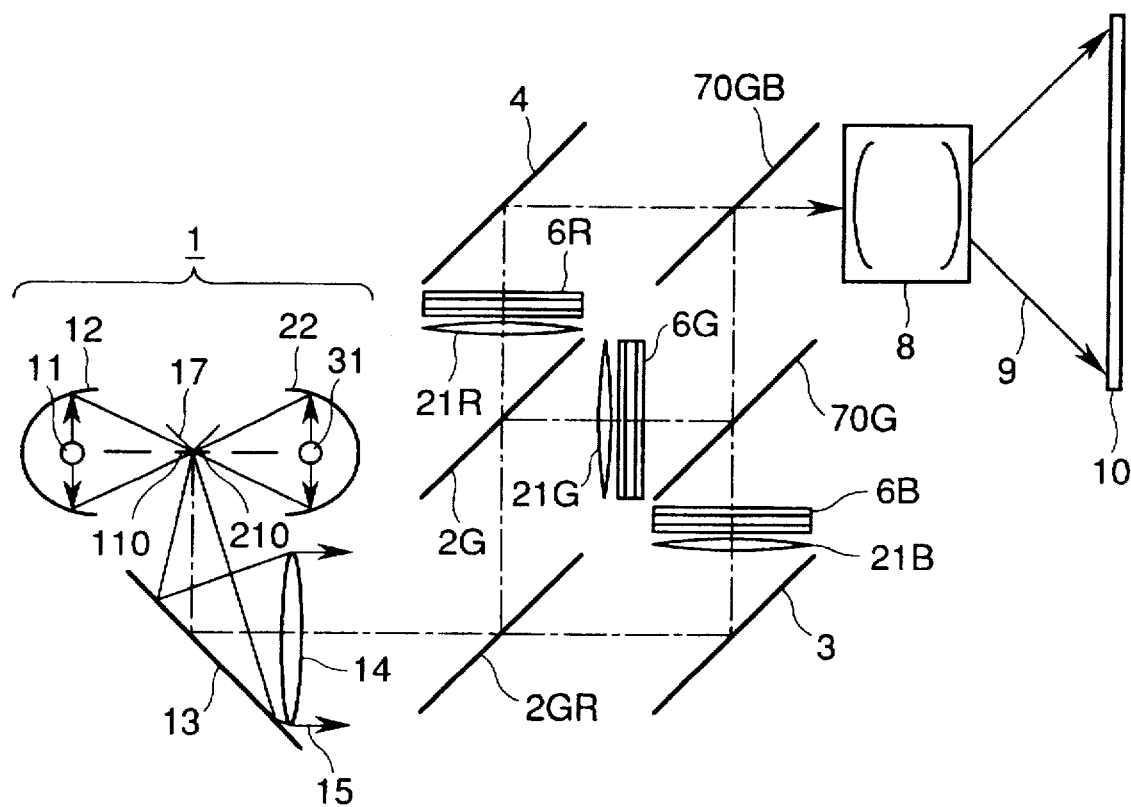
FIG. 8 illustrates a general construction of a light source apparatus according to a fifth embodiment used in a projection type display.

FIG. 8 illustrates a general construction of a light source apparatus according to a fifth embodiment used in a projection display. Referring to FIG. 8, lamps 11 and 31 emit white light and take the form of, for example, a metal halide lamp, xenon lamp, or tungsten halogen lamp. The concave reflecting mirrors 12 and 22 may take the form of, for example, an OPR or an elliptic mirror having an ellipsoidal surface of revolution centered on the optical axis. A bending mirror 17 has two reflecting surfaces that make an angle of 90 degrees with respect to each other. A light source 1 includes the concave reflecting mirrors 12 and 22, lamps 11 and 31, and bending mirror 17. The construction downstream of the mirror 13 and collimator lens 14 is the same as that shown in FIG. 7.

The operation of the fifth embodiment will now be described. The luminous flux emitted from the two lamps 11 and 31 is reflected by the reflecting mirrors 12 and 22, respectively, into a condensed luminous flux at two closely located points 110 and 210. The bending mirrors 17 are held so that the reflecting surfaces thereof are in the vicinity of the points 110 and 210. The bending mirrors 17 reflect the light near an area where the two reflecting surfaces meet each other, to the mirror 13. The lamps 11 and 31 are disposed with the bending mirror 17 therebetween so that the two beams of luminous flux are deflected by 90 degrees by the mirror 17. In practice, the arrangement of the lamps, deflection angle of the mirror, and angle that two reflecting surfaces make with respect to each other, may differ from those shown in FIG. 8, depending on individual designs of the apparatus. The number of lamps may be more than two, and the mirror 17 may be constructed to have as many reflecting surfaces as there are lamps. The construction downstream of the mirror 13 and collimator lens 14 is the same as the fourth embodiment, and therefore the description of behavior of the combined luminous flux downstream of the mirror 13 and collimator lens 14 has been omitted.

As described above, with the projection type display according to the fifth embodiment, the mirror 17 has reflecting surfaces corresponding to the light from the lamps 11 and 31, respectively. Thus, the use of the mirror 17 implements a light source of simple construction where the light beams emitted from the lamps 11 and 31 are combined.

Sixth Embodiment

Figure 9:
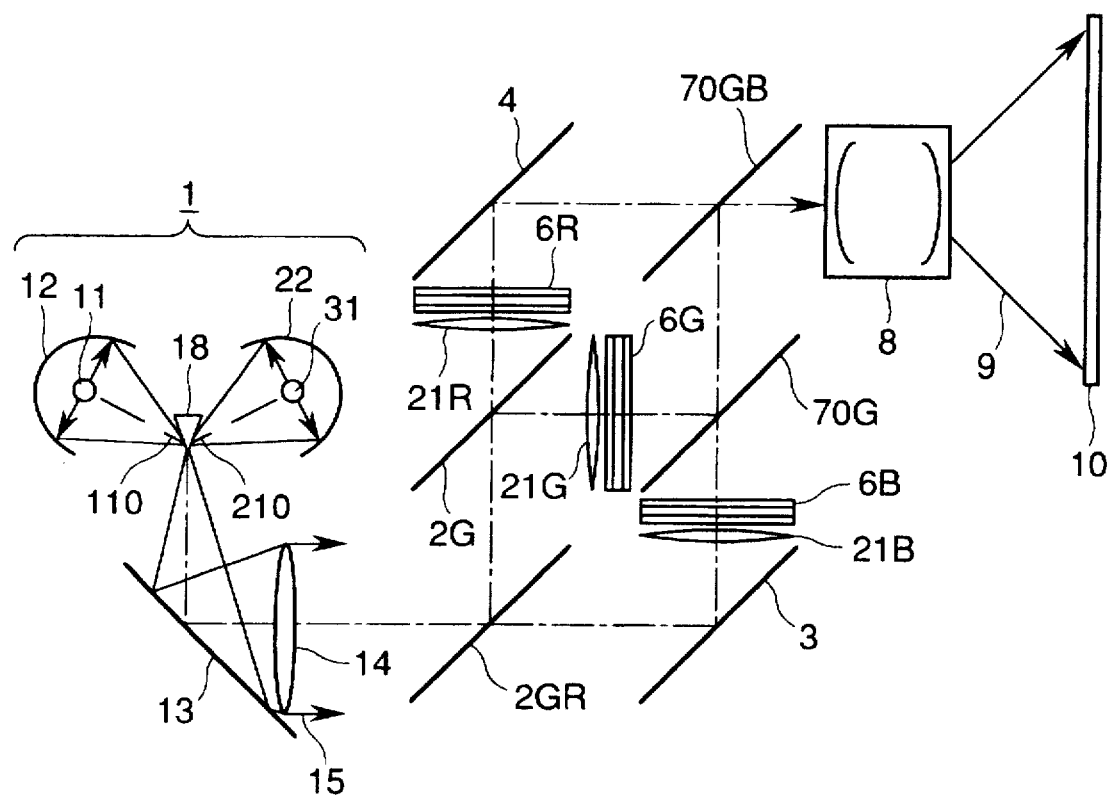
FIG. 9 illustrates a projection type display according to a sixth embodiment.
Figure 10:
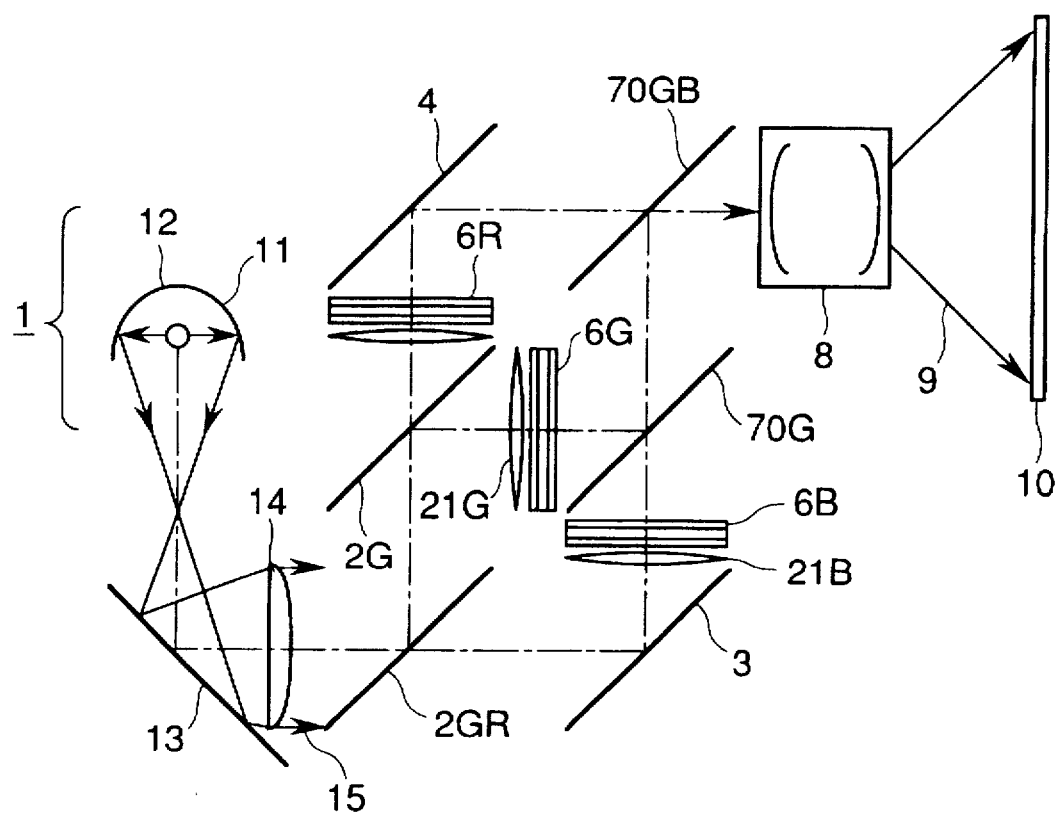
FIG. 10 illustrates a general construction of an optical system of a prior art liquid crystal projector.

FIG. 9 illustrates a light source apparatus according to a sixth embodiment used in a projection type display. Referring to FIG. 9, lamps 11 and 31 emit white light and take the form of, for example, a metal halide lamp, xenon lamp, and tungsten halogen lamp. The concave reflecting mirrors 11 and 22 may take the form of, for example, an OPR or an elliptic mirror having an ellipsoidal surface of revolution centered on the optical axis. A reflective prism 18 has two opposing reflecting surfaces. A light source 1 is formed which includes the concave reflecting mirrors 12 and 22, lamps 11 and 31, and reflective prism 18. The construction downstream of the mirror 13 and collimator lens 14 is the same as that shown in FIG. 7.

The operation of the sixth embodiment will now be described. Two beams of the luminous flux emitted from the two lamps 11 and 31 are reflected by the reflecting mirrors 12 and 22, respectively, into a condensed luminous flux at two closely located points 110 and 210. The reflective prism 18 are held so that the reflecting surfaces thereof are in the vicinity of the points 110 and 210. The reflective prism 18 reflect the light near an area where the two reflecting surfaces meet each other, to the mirror 13. The reflecting surfaces of the prism 18 form an acute angle, and the lamps 11 and 31 are disposed with the mirror 17 therebetween so that the two beams of luminous flux are deflected by an angle greater than 90 degrees by the prism 18. In practice, the deflection angle of the prism 18 and the angle that two reflecting surfaces make with respect to each other may of course differ from those shown in FIG. 8, depending on individual designs of the apparatus. The construction downstream of the mirror 13 and collimator lens 14 is the same as the fourth embodiment and therefore the description of behavior of the combined luminous flux has been omitted.

As described above, in the sixth embodiment, the prism 18 has reflecting surfaces that reflect the light from the lamps 11 and 31, respectively. Thus, the use of the prism 18 implements a light source of simple construction where the light beams emitted from the lamps 11 and 31 are combined.

The prism 18 may have as many reflecting surfaces as there are lamps. For example, the prism 18 is wedge-shaped if the number of lamps is two, a triangular pyramid if the number of lamps is three, and a rectangular pyramid if the number of lamps is four.

While the first to sixth embodiments have been described with respect to the construction where the images of primary colors are combined, the number of light valves may alternatively be one, two, or more than three. The light valves may not necessarily be formed of liquid crystal light valves, but may be of a variety of other types such as those using PLZT, oil film, micro mirror array, small grating array, or those in which an image written into a photoconductive layer is electrically transferred to a liquid crystal layer adjacent to the photoconductive layer. The light valve may be of either of transmission type or reflection type.

The first to sixth embodiments have been described by way of a front projection type display in which an image is projected from the front side of the screen but the invention may also be applied to a rear projection type display in which an image is projected from the back side of the screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light source apparatus for use with a projection type display comprising:

at least one light source for emitting light;

reflecting means provided correspondingly to said light source, said reflecting means directing the light emitted from said light source into a small area to form a converged luminous flux;

redistributing means for receiving said converged luminous flux and outputting a uniform luminous flux; and light-guiding means for guiding said uniform luminous flux therethrough, said light-guiding means having at least one light input section into which said uniform luminous flux is coupled, said light input section being provided correspondingly to said light source, and said light-guiding means combining the uniform luminous flux coupled into said light input section into a single beam of luminous flux, said light-guiding means having at least one light output section from which said single beam of luminous flux is output.

2. The light source apparatus according to claim 1, wherein said redistributing means includes light-refracting means provided between said reflecting means and said light-guiding means, said light-refracting means receiving the converged luminous flux from said reflecting means and varying an angle of divergence of the converged luminous flux so as to couple uniform luminous flux into said light-guiding means.

3. The light source apparatus according to claim 1, wherein said light-guiding means is a reflecting mirror for reflecting the converged luminous flux to combine the converged luminous flux into a single beam of luminous flux.

4. The light source apparatus according to claim 1, wherein said light-guiding means is a reflecting surface of a prism for reflecting the converged luminous flux to combine the converged luminous flux into a single beam of luminous flux.

5. A projection type display comprising:

at least one light source for emitting light;

reflecting means provided correspondingly to said at least one light source, said reflecting means gathering the light emitted from said light source into a small area to form a converged luminous flux;

redistributing means for receiving the converged luminous flux and outputting a uniform luminous flux;

light-guiding means for guiding said uniform luminous flux therethrough, said light-guiding means having at least one light input section into which said uniform luminous flux is coupled, said light input section being provided correspondingly to said light source, and said light-guiding means combining the uniform luminous flux transmitted through the light input section into a single beam of luminous flux, said light-guiding means having at least one light output section from which said combined luminous flux is output;

at least one light valve for forming an image; and projection lens for projecting an image from said light valve.

6. The projection type display according to claim 5, wherein said redistributing means includes:

light-refracting means provided between said reflecting means and said light-guiding means, said light-refracting means receiving the converged luminous flux from said reflecting means and varying an angle of divergence of the converged luminous flux so as to couple uniform luminous flux into said light-guiding means.

7. A projection type display comprising:

at least one light source for emitting light;

reflecting means provided correspondingly to said light source, said reflecting means converging the light emitted from said light source into converged luminous flux;

light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into one output beam of luminous flux, said light-guiding means having at least one light output section from which said luminous flux after having been combined is output;

at least one light valve for forming an image;

projection lens for projecting an image from said light valve; and cone-shaped light-refracting means provided between said reflecting means and said light-guiding means so that the converged luminous flux enters a flat surface of the cone and exits an inclined surface of the cone so as to couple the converged luminous flux into said light-guiding means.

8. The light source apparatus according to claim 5, wherein said reflecting means is an elliptic mirror having an ellipsoidal surface of revolution centered on an optical axis thereof and having first and second focal points on the optical axis, said light-refracting means is of a cone shape located in the vicinity of said second focal point.

9. The light source apparatus according to claim 5, wherein said light-guiding means is any one of:

an optical fiber where a hollow cylindrical cladding is filled with any one of a transparent gel-like medium, transparent liquid medium, transparent glass medium, and transparent polymer medium, the cylindrical cladding having a refractive index smaller than that of the medium filling the cladding;

a bundle of element optical fibers randomly arranged both in a first plane through which the light is incident on the fibers and in a second plane through which the light exits the fibers so that there is no correlation between arrangements of the fibers in said first and second planes; and a molded plastics or a molded rubber.

10. The projection type display according to claim 7, further including:

first lens means located between said light input section and said refracting means, said first lens means coupling the luminous flux refracted by said light-refracting means into said light-guiding means; and second lens means located between said light-guiding means and said light valve, said second lens means having a focal point located between said second lens means and said light output section, said second lens means being positioned such that said luminous flux exits said light output section at a position upstream or downstream of said focal point.

11. The projection type display according to claim 10, further including a plurality of light valves, as many second lenses as there are light valves, and as many projection lenses as there are light valves, wherein said light-guiding means has as many light output sections as there are light valves.

12. The projection type display according to claim 10, further including a plurality of light sources, as many first lenses as there are light sources, and as many reflectors as there are light sources, wherein said light-guiding means has as many light input sections as there are light sources.

13. A light source apparatus for use with a projection type display comprising:

a plurality of light sources for emitting light;

a plurality of reflecting means provided correspondingly to said light sources, each of said light reflecting means converging the light emitted from a corresponding light source into converged luminous flux;

a plurality of reflecting mirrors provided correspondingly to said reflecting means, said reflecting mirrors reflecting corresponding converged luminous flux so as to combine the luminous flux from said reflecting mirrors into one output beam.

14. A light source apparatus for use with a projection type display, comprising:

a plurality of light sources emitting light;

a plurality of reflecting means provided correspondingly to said light sources, each of said reflecting means converging the light emitted from a corresponding light source into converged luminous flux;

a prism having a plurality of reflecting surfaces, the reflecting surface reflecting a corresponding converged luminous flux so as to combine the converged luminous flux from said reflecting means into one output beam.

15. A light source apparatus for use with a projection type display, comprising:

at least one light source for emitting light;

reflecting means provided correspondingly to said light source, said reflecting means converging the light emitted from said light source into converged luminous flux;

light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into one beam of luminous flux, said light-guiding means having at least one light output section from which said luminous flux after having been combined is output; and cone-shaped light-refracting means provided between said reflecting means and said light-guiding means so that the luminous flux from said reflecting means enters a flat surface of the cone and exits an inclined surface of the cone, the luminous flux exiting the inclined surface subsequently entering said light input section of said light-guiding means.

16. The light source apparatus according to claim 15, further including:

a first lens located between said light input section and said refracting means, said first lens coupling the converged luminous flux refracted by said light-refracting means into said light-guiding means; and a second lens located downstream of said light-guiding means, said second lens having a focal point located between said second lens and said light output section, said second lens being positioned such that said single beam of luminous flux exits said light output section at a position upstream or downstream of said focal point.

17. The light source apparatus according to claim 5, wherein said light-guiding means has a single light output section and as many light input sections as there are light sources, and the luminous flux coupled into said light input sections is combined into said single light output section.

18. A light source apparatus for use with a projection type display comprising:

at least one light source for emitting light;

reflecting means provided correspondingly to said light source, said reflecting means gathering the light emitted from said light source into a small area to form a converged luminous flux;

light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into a single beam of luminous flux, said light-guiding means having at least one light output section from which said single beam of luminous flux is output;

light-refracting means provided between said reflecting means and said light-guiding means, said light-refracting means receiving the converged luminous flux from said reflecting means for refracting converged luminous flux so as to couple the converged luminous flux into said light-guiding means;

a first lens located between said light input section and said refracting means, said first lens coupling the converged luminous flux refracted by said light-refracting means into said light-guiding means; and a second lens located downstream of said light-guiding means, said second lens having a focal point located between said second lens and said light output section, said second lens being positioned such that single beam of luminous flux exits said light output section at a position upstream or downstream of said focal point.

19. The light source apparatus according to claim 5, wherein said reflecting means is an orthogonal parabolic reflector having a paraboloid of revolution centered on an optical axis thereof and having a focal point on the optical axis, said light-refracting means is of a cone shape located in the vicinity of said focal point.

20. A light source apparatus for use with a projection type display comprising:

at least one light source for emitting light;

an elliptic mirror having an ellipsoidal surface of revolution centered on an optical axis thereof and having first and second focal points on the optical axis provided correspondingly to said light source, said elliptic mirror gathering the light emitted from said light source into a small area to form a converged luminous flux;

light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into a single beam of luminous flux, said light-guiding means having at least one light output section from which said single beam of luminous flux is output; and light-refracting means provided between said reflecting means and said light-guiding means, said light-refracting means receiving the converged luminous flux from said reflecting means for refracting converged luminous flux so as to couple the converged luminous flux into said light-guiding means, said light-refracting means being a cone shape located in the vicinity of said second focal point of said elliptic mirror.

21. A light source apparatus for use with a projection type display comprising:

at least one light source for emitting light;

an elliptic mirror having an ellipsoidal surface of revolution centered on an optical axis thereof and having first and second focal points on the optical axis provided correspondingly to said light source, said light source being located in the vicinity of said first focal point of said elliptic mirror, said elliptic mirror gathering the light emitted from said light source into a small area to form a converged luminous flux; and light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into a single beam of luminous flux, said light-guiding means having at least one light output section from which said single beam of luminous flux is output.

22. The light source apparatus according to claim 21, wherein said light source is a high voltage discharge lamp having a light-emitting portion positioned between said first and second focal points, and away from said first focal point by a distance in the range of two to three millimeters.

23. A light source apparatus for use with a projection type display comprising:

at least one light source for emitting light;

reflecting means provided correspondingly to said light source, said reflecting means gathering the light emitted from said light source into a small area to form a converged luminous flux, wherein said reflecting means is an orthogonal parabolic reflector having a paraboloid of revolution centered on an optical axis thereof, said paraboloid being given by Equations (1) and (2), $$Y = 2\{f(f+X)\}^{1/2} \text{ where } -f \leq X \leq 0 \qquad \text{Eq. (1)}$$

$$Y = 2\{f(f-X)\}^{1/2} \text{ where } 0 \leq X \leq f \qquad \text{Eq. (2)}$$

where f is a focal length of the paraboloid located on X-axis of a coordinate (X, Y); and light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into a single beam of luminous flux, said light-guiding means having at least one light output section from which said single beam of luminous flux is output.

24. A light source apparatus for use with a projection type display comprising:

at least one light source for emitting light, said at least one light source including a plurality of lamps, all of which are glowing at the same time;

reflecting means provided correspondingly to said light source, said reflecting means gathering the light emitted from said light source into a small area to form a converged luminous flux; and light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into a single beam of luminous flux, said light-guiding means having at least one light output section from which said single beam of luminous flux is output.

25. A light source apparatus for use with a projection type display comprising:

at least one light source for emitting light, said at least one light source including a plurality of lamps, one of which is glowing at a time;

reflecting means provided correspondingly to said light source, said reflecting means gathering the light emitted from said light source into a small area to form a converged luminous flux; and light-guiding means for guiding said luminous flux therethrough, said light-guiding means having at least one light input section into which said luminous flux is coupled, said light input section being provided correspondingly to said light source, and said light-guiding means combining the luminous flux coupled into said light input section into a single beam of luminous flux, said light-guiding means having at least one light output section from which said single beam of luminous flux is output.

* * * * *